United States Patent [19]

Hofer et al.

[11] Patent Number: 4,772,092
[45] Date of Patent: Sep. 20, 1988

[54] CRACK DETECTION ARRANGEMENT UTILIZING OPTICAL FIBRES AS REINFORCEMENT FIBRES

[75] Inventors: Bernd Hofer, Lemwerder; Samir Malek, Leuchtenburg, both of Fed. Rep. of Germany

[73] Assignee: MBB GmbH, Bremen, Fed. Rep. of Germany

[21] Appl. No.: 807,865

[22] Filed: Dec. 11, 1985

[30] Foreign Application Priority Data

Dec. 22, 1984 [DE] Fed. Rep. of Germany ....... 3447122

[51] Int. Cl.$^4$ ............................. G02B 6/04; H01J 5/16
[52] U.S. Cl. .................................. 350/96.24; 350/96.29; 350/96.10; 250/227; 250/231 R; 250/231 P; 73/800
[58] Field of Search ............... 350/96.10, 96.23, 96.24, 350/96.20, 96.29; 250/227, 231 R, 231 P; 73/800

[56] References Cited

U.S. PATENT DOCUMENTS

| | | | |
|---|---|---|---|
| 3,984,172 | 10/1975 | Miller | 350/96.24 |
| 4,080,045 | 3/1978 | Nakatsubo | 350/96.24 |
| 4,367,460 | 1/1983 | Hodara | 350/96.10 X |
| 4,468,089 | 8/1984 | Brorein | 350/96.23 |
| 4,537,469 | 8/1985 | Kircher | 350/96.24 |
| 4,538,527 | 9/1985 | Kitchen | 350/96.10 X |
| 4,581,527 | 4/1986 | Crane et al. | 250/227 |
| 4,586,030 | 4/1986 | Klostermann | 350/96.24 X |
| 4,598,975 | 7/1986 | Bussard et al. | 350/96.24 |
| 4,603,252 | 7/1986 | Malek et al. | 250/227 |
| 4,609,816 | 9/1986 | Severin | 250/227 |
| 4,629,318 | 12/1986 | Malek et al. | 250/227 X |
| 4,636,638 | 1/1987 | Huang et al. | 250/231 R |
| 4,692,610 | 9/1987 | Szuchy | 250/227 |

FOREIGN PATENT DOCUMENTS 2120398 11/1983 United Kingdom ............ 350/96.24

Primary Examiner—William L. Sikes
Assistant Examiner—Brian M. Healy
Attorney, Agent, or Firm—Ralf H. Siegemund

[57] ABSTRACT

An arrangement for detecting cracks within a construction or structure part made of multiple lamina in a compound fashion and wherein at least some of said lamina are made of fibres, being at least partially embedded in synthetic resin, includes light conducting fibres in said lamina taking the place of regular ones of said fibres within a pattern of such fibres either as part of the weaving pattern or as particular interposed layer.

7 Claims, 1 Drawing Sheet

CRACK DETECTION ARRANGEMENT UTILIZING OPTICAL FIBRES AS REINFORCEMENT FIBRES

BACKGROUND OF THE INVENTION

The present invention relates to the measurement and detection of cracks and fissures in test objects particularly under utilization of light conducting fibres which will break in the instance of a crack or fissure; the light conductors being embedded into the test object will break and the crack in the conductor will impede the light transmission through such a light conductor so that the existence of a crack or fissure can be determined and indicated therewith.

A device of the kind to which the invention pertains is disclosed in our U.S. Pat. No. 4,603,252, filed Nov. 7, 1983; (see also our U.S. Pat. No. 4,629,318). The known device uses synthetic fibre material, e.g. glass fibres or quartz fibres, which are integrated in an object made for example of a synthetic material whereby the arrangement is carried out in a particular pattern so that even during the manufacturing of the particular part any irregularities in the material distribution is detectable through local deviation of the embedded light conductors from the normal pattern of initial and/or intended placement. For crack detection light is coupled into one end of the fibres and unimpeded passage of light through all of the fibres is detected through appropriate light detecting means and devices. As soon as a crack appears the light transmission is drastically reduced and the light detector can readily respond to that reduction causing correpondingly a signal which can be indicated. It is a particular feature of this kind of crack detection that once a crack has occurred the signal will remain. Here it has to be observed that a crack may occur as a result of internal tension or when stress is being applied externally tending to pull the part apart. Once the stress or tension has been removed the crack in the part as such may hardly be noticeable any longer but it is still there. On the other hand the interruption in light conduction of the affected fibre will not be restored, even if the broken fibre parts are so to speak pushed back together. Another advantage of this crack detecting device is to be seen in the fact that this kind of monitoring and indication is not prone to corrosion.

DESCRIPTION OF THE INVENTION

It is an object of the present invention to improve crack detection of the type mentioned above whereby the insertion of light conducting fibres into a compound material and part and particularly as far as a definite pattern positioning is concerned, are significantly facilitated.

In accordance with the preferred embodiment of the invention the object is attained in that the several light conducting fibres are inserted in fibre layers and in between elements of a compound part whereby either by replacing some of the regular fibres with light conducting fibres, or placing light conducting fibres in between two layers of regular fibres in a mesh the respective surfaces of the parts to be put together are impregnated in resin, e.g. a synthetic resin. The inventive feature offers the advantage that the compound part can be made through preimpregnated mesh sheathing or lower lamina, so called prepegs, which can be provided with the requisite light conducting fibres for purposes of obtaining crack monitoring function.

The light conducting fibres should have the same kind of order as the various regular fibres either in a unidirectional fibre ribbon or within the weaving pattern of a woven sheet. Alternatively it is possible to provide a light conducting fibres between two regular fibre layers so as to establish a subcompound and extended lamina. On the other hand it is possible to provide within a multilamina structure one or more layers exclusively from light fibres which are woven or otherwise combined to establish a mesh.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Detailed Description of the Invention

Figure 1:
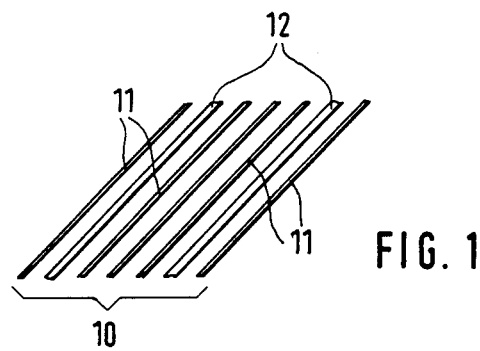
FIG. 1 is a somewhat schematic but a perspective view of a portion of a basically unidirectionally extending fibre ribbon.
Figure 2:
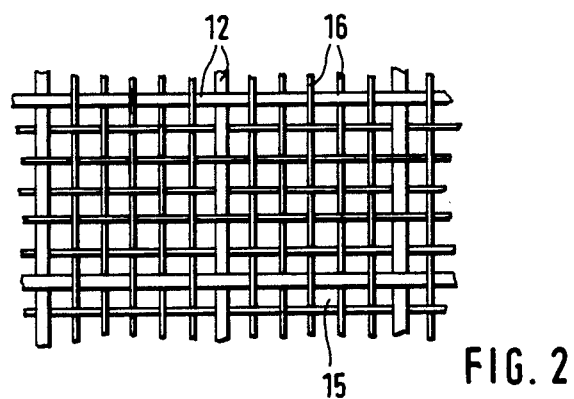
FIG. 2 illustrates a fibre sheet made of woven fibres.

Proceeding now to the detailed description of the drawings FIG. 1 illustrates specifically regular fibres 11 of a unidirectionally extending fibre ribbon. The fibres are shown somewhat wider spaced than is regularly the case, and the figure shows furthermore individual light conducting fibres 12 interposed between some of the regular fibres 11. The fibres all are embedded in a resin impregnation which after curing establishes a ribbon being a ribbon as such, and the various fibres are reinforcing fibres traversing longitudinally the ribbon and having included several light conductors such as 12 spaced apart. On the other hand FIG. 2 illustrates a lattice kind woven layer 15 which includes regular fibres 16, some of the regular fibres 16 in the regular weaving pattern are replaced by light conducting fibres 12. This establishes an analogous situation to the situation shown in FIG. 1.

Figure 3:
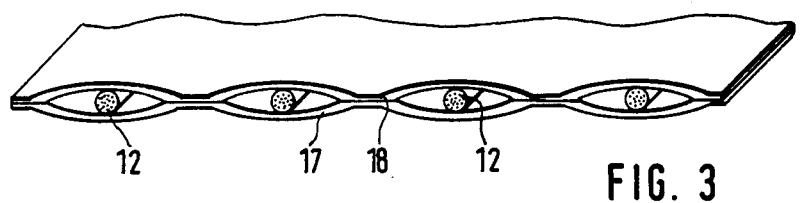
FIG. 3 illustrates a portion of layers in which light fibres are embedded.

FIG. 3 illustrates two fibre layers 17 and 18 in which the individual fibres are not identified. They can be woven or densely placed in respective layers 17 or 18. Individual light conducting fibres 12 are regularly placed within a compound part established by the two layers 17 and 18. Thus one can begin with regular fibre layers, so called prepeg layers or lamina, and produce expanded prepeg layers which include embedded or inplaced light conducting fibres 12 to serve as crack detectors.

Alternatively the prepeg layers or at least some of them or one of them within the compound part can be made in its entirety of light conducting fibres. Preimpregnated fibre layers in which in some form or another light conducting fibres are included. One may assemble construction parts in a compound multilamina fashion from these lamina. The crack detecting light conducting fibres will be embedded strategically throughout that part. If particularly prepared layers of the type shown in FIG. 2 or subcompounds shown in FIG. 3 are used, the assembly of compound parts from such elements can proceed directly and does not require anymore the special embedment of light conducting fibres.

The manufacturer of a part in a compound fashion under utilization of individual prepared prepeg layers may be carried out in the so called wet-in-wet method or through bonding of subcomponents using subcomponents preassembled in the aforementioned manner and having already been cured. In the case of cured lamina a thin film can be used as an adhesive which is a self contained foil-like component in which heating is used only for purposes of providing bonding action. The adhesive may also be penetrated by light conductor fibres. This feature permits already monitoring of the bond that is obtained with regard to any cracks that may occur just in the bonding layer. Such adhesive may itself be provided already with light conducting fibres and used as fibre bonding ribbons for purposes of providing bonding in special cases.

The invention is not limited to the embodiments described above but all changes and modifications thereof, not constituting departures from the spirit and scope of the invention, are intended to be included.

We claim:

1. In an arrangement for detecting cracks within a construction or structure part made of multiple lamina in a compound fashion the improvement comprising:
   at least some of said lamina being made of non-light conducting fibres, being arranged in a particular pattern and being at least partially embedded in synthetic resin;
   light conducting fibres included in said lamina and in another regular pattern while taking the place of regular ones of said non-light conducting fibres within said first mentioned particular pattern of fibres, such that plural non-light conducting fibres separate any two of said light conducting fibres extending parallel to said plural non-light conducting fibres, and
   said light conducting fibres thereby constituting also fibre-reinforcement of the structure part.

2. The improvement as in claim 1 wherein said non-light conducting fibres as embedded are unidirectionally embedded in and constituting a part of a non-light conducting fibre ribbon, the non-light conducting fibres establishing a particular pattern of placement there being individual ones of the regular non-light conducting fibres replaced by the light conducting fibres.

3. The improvement as in claim 1 wherein said regular non-light conducting fibres are interwoven and some of the regular non-light conducting fibres are replaced by light conducting fibres.

4. In an arrangement for detecting cracks within a construction or structure part made of multiple lamina in a compound fashion the improvement comprising:
   a first and a second lamina of regular nonlight conducting fibres constituting two of said lamina, there being a plurality of light conducting fibres interposed between said two lamina as a third, intermediate lamina.

5. The improvement as in claim 4 said intermediate lamina made exclusively of light conducting fibres.

6. The improvement as in claim 4 and including bonding layer means interposed between said two lamina said light conducting fibres being embedded in said bonding layer.

7. In a construction part made of compound material and including lamina or layers made of fibres in a regular pattern, being composed of nonlight conducting fibres and light conducting fibres regularly interspersed in and being part of said regular pattern, such that plural non-light conducting fibres separate any two of the light conducting fibres that extend parallel to the latter plural non-light conducting fibres, said light conducting fibres constituting a portion of fibre reinforcement as established otherwise by non-light conducting fibres.

* * * * *